US008360633B2

(12) United States Patent
Luckhardt et al.

(10) Patent No.: US 8,360,633 B2
(45) Date of Patent: Jan. 29, 2013

(54) DEVICE AND METHOD FOR DETERMINING THE TEMPERATURE INSIDE AN ITEM TO BE COOKED

(75) Inventors: Christoph Luckhardt, Schenklengsfeld (DE); Florian Ruther, Rothenburg ob der Tauber (DE)

(73) Assignee: Electrolux Home Products Corporation N.V., Zaventem (BE)

( * ) Notice: Subject to any disclaimer, the term of this patent is extended or adjusted under 35 U.S.C. 154(b) by 697 days.

(21) Appl. No.: 12/444,401

(22) PCT Filed: Oct. 30, 2007

(86) PCT No.: PCT/EP2007/009417

§ 371 (c)(1),
(2), (4) Date: Jan. 4, 2010

(87) PCT Pub. No.: WO2008/052747

PCT Pub. Date: May 8, 2008

(65) Prior Publication Data

US 2010/0128755 A1 May 27, 2010

(30) Foreign Application Priority Data

Nov. 2, 2006 (EP) .................................... 06022798

(51) Int. Cl.

| | |
|---|---|
| ***G01J 5/00*** | (2006.01) |
| ***G01K 7/00*** | (2006.01) |
| ***G01K 1/00*** | (2006.01) |
| ***G01N 25/00*** | (2006.01) |

(52) U.S. Cl. .......... 374/121; 374/44; 374/130; 374/149; 374/45; 374/167

(58) Field of Classification Search .................... 374/44, 374/130, 149, 45, 121, 124, 167
See application file for complete search history.

(56) References Cited

U.S. PATENT DOCUMENTS 5,693,247 A 12/1997 Bu et al.
(Continued)

FOREIGN PATENT DOCUMENTS

DE 19533514 A1 9/1997
(Continued)

OTHER PUBLICATIONS

International Search Report for PCT/EP2007/009417 dated Nov. 6, 2008, 2 pages.

*Primary Examiner* — Lisa Caputo
*Assistant Examiner* — Mirellys Jagan
(74) *Attorney, Agent, or Firm* — Pearne & Gordon LLP

(57) ABSTRACT

The invention concerns a device for determining the temperature inside an item to be cooked (12). The invention comprises at least one temperature sensor (20) for detecting at least one surface temperature of the item to be cooked (12) and/or an ambient temperature around the item to be cooked, particularly at a measuring location inside the cooking chamber surrounding the item to be cooked, preferably with an ambient temperature sensor which is arranged at said measuring location. Furthermore, the device comprises at least one distance sensor (22) for detecting one or multiple distances between the distance sensor (22) and one or multiple distance measuring points (36) on the surface of the item to be cooked (12). In addition, the device comprises at least one time measuring device for measuring elapsed time during preparation of the item to be cooked (12) and at least one calculation device for calculating the temperature inside the item to be cooked (12) using the surface temperature of the item to be cooked (12) and/or the ambient temperature, the distance or multiple distances, elapsed time, and the start temperature of the item to be cooked (12). The invention also concerns a method for determining the temperature inside an item to be cooked (12).

38 Claims, 1 Drawing Sheet

U.S. PATENT DOCUMENTS 5,744,786 A * 4/1998 Kim .............................. 219/711
6,121,596 A * 9/2000 Taino et al. .................. 219/711
6,299,920 B1 * 10/2001 Saksena ........................ 426/231

FOREIGN PATENT DOCUMENTS

EP 0264935 A2 4/1988
EP 1150549 A 10/2001

* cited by examiner

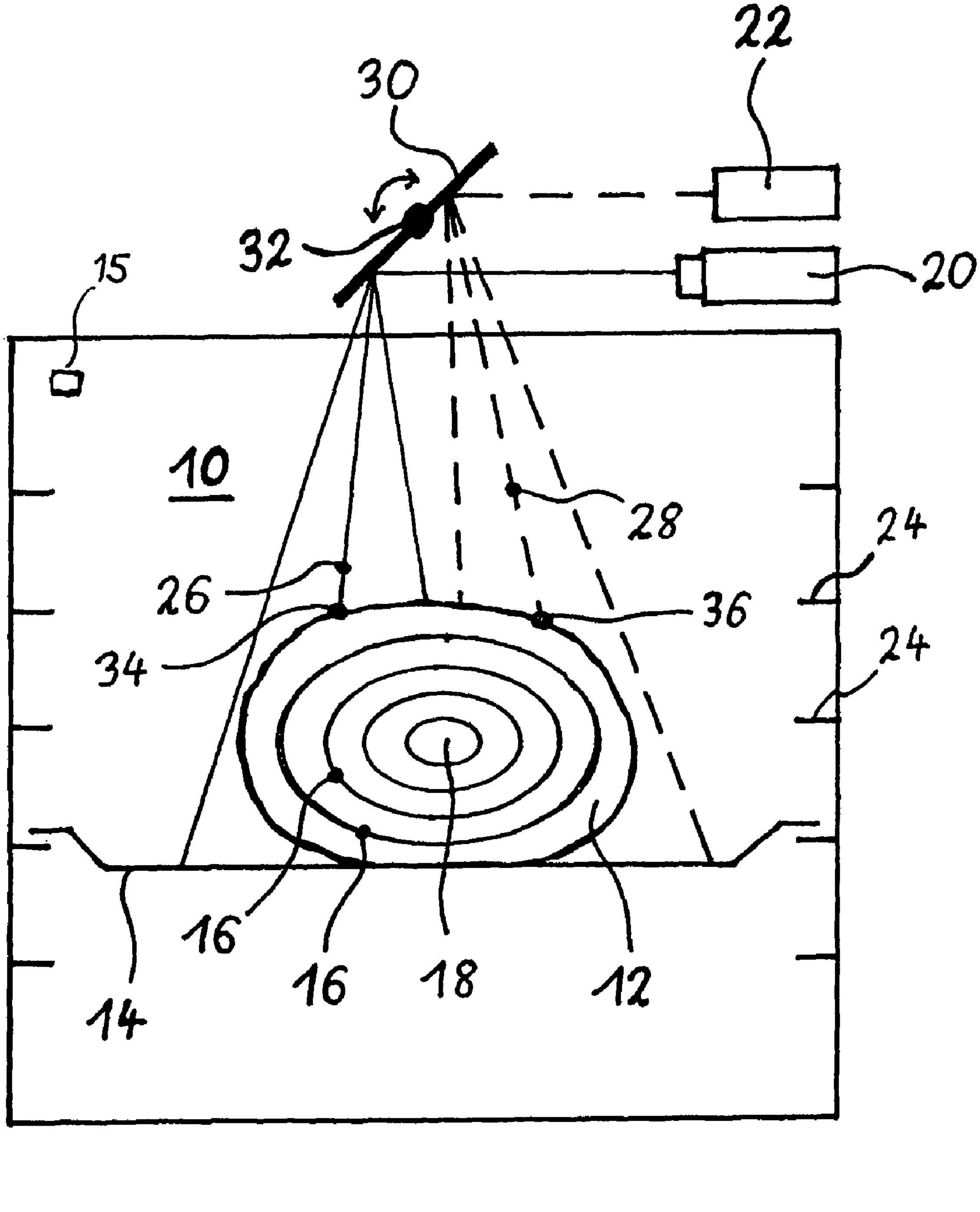
22
30
32
20
15
10
28
24
26
36
34
24
16
16
18
12
14

DEVICE AND METHOD FOR DETERMINING THE TEMPERATURE INSIDE AN ITEM TO BE COOKED

BACKGROUND OF THE INVENTION

The invention concerns a device for determining the temperature inside an item to be cooked. Furthermore, the invention concerns a cooking device comprising the device for determining the temperature inside an item to be cooked. Additionally, a method according to the invention is provided for determining the temperature inside an item to be cooked.

The temperature inside an item to be cooked is an indicator of the state of preparation of the item to be cooked. Particularly, the temperature of the coldest spot in the item to be cooked, which is mostly in the center of said item, is relevant to the preparation state of the item to be cooked. Also, the pasteurizing value of the item to be cooked is associated with the temperature of the coldest spot in said item.

The temperature of the item to be cooked which is located inside a cooking device can be measured with a temperature probe. The temperature sensor is designed, for example, like a meat skewer and electrically coupled to the cooking device by means of a cable. For the user, however, it is difficult to find the coldest spot in the item to be cooked. In addition, the user finds the cable troublesome.

The problem to be addressed by the invention is to present an improved device and an improved method for determining the temperature inside an item to be cooked.

SUMMARY OF THE INVENTION

With reference to the device, this problem is solved by the subject matter according to claim 1.

According to the invention, a device for determining the temperature inside an item to be cooked is presented, having the following:

at least one temperature sensor for detecting at least one surface temperature of the item to be cooked and/or an ambient temperature around the item to be cooked, particularly at a measuring point inside the cooking chamber which surrounds the item to be cooked, preferably with a temperature sensor for measuring the ambient temperature, which is arranged at the measuring point, at least one distance sensor for detecting one or multiple distances between the distance sensor and one or multiple distance measuring points on the surface of the item to be cooked, at least one time measuring device for measuring elapsed time during preparation of the item to be cooked, and at least one calculating device for calculating the temperature inside the item to be cooked, using the surface temperature of the item to be cooked and/or the ambient temperature, the one or multiple distances, elapsed time, and the start temperature of the item to be cooked.

The essence of the invention lies in the combination of the temperature sensor and distance sensor, such that the surface temperature and/or the ambient temperature and at least a part of the geometry of the item to be cooked can be determined at the same time. Using the elapsed time, the start temperature, and additional parameters, it is possible to calculate the temperature inside the item to be cooked. The additional parameters can be given explicitly, or implicitly contained in the calculating device. By means of a calibration process using different items to be cooked, a parameter field, for example, can be compiled and stored in the calculating device.

The calculating device is preferably either designed or programmable for calculating the temperature inside the item to be cooked on the basis of a thermal conductivity equation. Using the thermal conductivity equation and the measured values, it is possible to calculate the temperature inside the item to be cooked. The calculation can be carried out in a particularly simple manner using an approximation of the thermal conductivity equation. In this case, it is assumed, for example, that the item to be cooked has a particularly simple shape, for example that of a cylinder or a cuboid.

As an example, the calculating device can be designed or programmable for calculating the geometric shape of the item to be cooked from one or multiple distances. The more distance measuring points that are used, the more precisely the shape of the item to be cooked can be determined. In the case of only one distance measuring point, the insertion height of the item to be cooked must be known.

Furthermore, the calculating device can be designed or programmable for calculating the temperature inside the item to be cooked by utilizing the geometric shape of the item to be cooked. With a numeric solution of the thermal conductivity equation, items to be cooked having an uneven shape can also be calculated.

Preferably, the calculating device is designed or programmable for calculating the temperature in the center of the item to be cooked. The center of the item to be cooked is the coldest spot in most cooking processes. Consequently, it is possible to determine, from the chronological progression of the temperature in the center of the item to be cooked, whether and when the cooking process is complete.

In the preferred embodiment, the temperature sensor is designed as an optical sensor and/or as an infrared sensor. Additionally, the distance sensor is preferably designed as an optical sensor and/or as an infrared sensor, although said distance sensor can also be an ultrasonic sensor or radar sensor. The temperature sensor and the distance sensor can be arranged inside or on the cooking chamber, in such a way that the user does not find said sensors troublesome.

In addition, the device can comprise a prism or a mirror or another optical deflection device, which can be arranged or mounted in the optical path between the temperature sensor and/or distance sensor on one side, and on the other side, the item to be cooked or an area where the item to be cooked will be placed.

One advantageous embodiment provides for an at least sectionwise, preferably optical, scan of the surface of the item to be cooked.

In addition, a first variant is provided, in which the temperature sensor and/or the distance sensor is pivotably, moveably, and/or rotatably arranged or mountable in or on a cooking chamber, such that, by means of at least one light beam or infrared beam, the surface of the item to be cooked can be scanned at least by section.

Additionally, the prism or the mirror of the optical deflection device can be pivotably, moveably, and/or rotatably arranged or mounted in or on the cooking chamber. If the mirror, the prism, or the optical deflection device is pivotable, the temperature sensor and distance sensor can be fixed and immovably mounted. In such a way, the complexity of design is especially minimal, because only the prism or the mirror or the optical deflection device is movable.

The temperature sensor can be designed for detecting the surface temperature at multiple temperature measuring points on the surface of the item to be cooked. In this manner, it is possible to detect the temperature distribution especially well.

The distance measuring points and/or the temperature measuring points are appropriately selected or selectable from a predetermined schema.

In the preferred embodiment, the temperature sensor, the distance sensor, and/or the prism or the mirror are arranged or mountable outside the cooking chamber in a cool or cooled area. This allows the use of cost efficient sensors and contributes to high measurement precision. For this arrangement, the cooled area is, for example, designed as a cooling channel with at least one cooling unit, particularly a blower.

The device preferably has an input device for manually or automatically inputting one or multiple parameters. Using said input device, the user can also input parameters which, for example, concern the item to be cooked.

The input device is advantageously coupled with the calculation device, so that the parameter or parameters for calculating the temperature inside the item to be cooked are available for use. Consequently, known parameters can be used and referred to for the calculation.

Furthermore, the invention concerns a cooking device, which comprises the device described above for determining the temperature inside an item to be cooked.

The cooking device preferably contains a cool or cooled area, in which the temperature sensor, the distance sensor, and/or the prism or the mirror or the deflection device are arranged or mountable. As an example, the cool or cooled area is designed as a blower channel.

In reference to the method, the problem is solved by the subject matter according to patent claim 20.

The method according to the invention for determining the temperature inside an item to be cooked comprises the following steps:

- detection of at least one temperature on the surface of the item to be cooked
- detection of one or multiple distances between a predetermined position and one or multiple distance measuring points on the surface of the item to be cooked
- measurement of elapsed time during the cooking process, and
- calculation of the temperature inside the item to be cooked using the surface temperature of the item to be cooked and/or the ambient temperature, one or multiple distances, the time, and the start temperature of the item to be cooked.

The essence of the method according to the invention lies in the combination of the detection of the temperature and the detection of the distance, such that the surface temperature and geometry of the item to be cooked can be determined at the same time. Using the time, the start temperature, and additional parameters, it is possible to calculate the temperature inside the item to be cooked.

Particularly, the invention provides that the temperature inside the item to be cooked is calculated on the basis of a thermal conductivity equation. The thermal conductivity equation and the measured values allow the calculation of the temperature inside the item to be cooked. The calculation can be made especially simple by using an approximation of the thermal conductivity equation. As such, it is assumed that the item to be cooked has an especially simple geometric shape, for example that of a cylinder or a cuboid.

As an example, the geometric shape of the item to be cooked can be calculated from the multiple distances. Subsequently, the temperature inside the item to be cooked can be calculated from the geometric shape of the item to be cooked.

In the preferred embodiment, the temperature in the center of the item to be cooked is determined. In many cooking processes, the center of the item to be cooked is the coldest spot. Therefore, it is possible to determine, using the chronological progression of the temperature in the center of the item to be cooked, whether and when the cooking process is complete.

The distance or the multiple distances are meteorologically detected by means of a scan of at least one section of the surface of the item to be cooked, using an, infrared beam. Additionally, the temperature can be detected by means of a scan of at least one section of the surface of the item to be cooked, using an infrared beam.

In addition, the chronological progression of the surface temperature of the item to be cooked, the density of the item to be cooked, the heat transfer coefficient, the thermal conductivity of the item to be cooked, and/or the heat capacity of the item can be used as parameters.

If it is possible to make an assumption or determine empirically beforehand how the temperature profile of the surface temperature and/or the ambient temperature will behave, then in another embodiment, it can be extrapolated with help of the thermal conductivity equation how much time it will take to reach a predetermined core temperature.

In this way, it is possible to inform the user early in the process of the time when the cooking process will be completed.

Finally, the invention provides for the pasteurizing value for the item to be cooked to be calculated from the chronological progression of the temperature in the center of the item to be cooked. The required parameters can be assigned when the user inputs the type of item to be cooked by means of a menu selection.

Further features, advantages, and special embodiments of the invention are the subject matter of the claims below.

BRIEF DESCRIPTION OF THE DRAWING(S)

The device for determining thermal magnitudes according to the invention is more specifically explained hereafter with the example of a preferred embodiment and with reference to the attached drawing. The single FIGURE shows a schematic section view of a cooking chamber with a preferred embodiment of the device according to the invention.

DETAILED DESCRIPTION OF THE INVENTION

The FIGURE shows a schematic section view of a cooking chamber 10 of a cooking device. The cooking device comprises a device for determining the temperature inside an item to be cooked 12. On the inside of both side walls of the cooking chamber 10 are guide rails 24, which are each arranged in pairs at the same height. The guide rails 24 are arranged horizontally and extend perpendicular to the plane of the drawing. On two guide rails 24 at the same height is a rack 14, which can be constructed as, for example, a wire rack or a sheet rack. On the rack 14 is the item to be cooked 12. The item to be cooked 12 is likewise illustrated in a section view. Isotherms 16 are illustrated inside the item to be cooked 12, to clarify the spatial temperature distribution. A center 18 shows the geometric center of the item to be cooked 12. Because the item to be cooked 12 is heated from the outside to the inside, the center 18 shows the coldest spot in the item to be cooked 12.

A temperature sensor 20 and a distance sensor 22 are arranged above the cooking chamber 10. In this concrete embodiment, the temperature sensor 20 and the distance sensor 22 are designed as infrared sensors. Furthermore, a mirror 30 is arranged above the cooking chamber 10. The mirror 30 is installed pivotably about an axis 32. The axis 32 extends perpendicular to the plane of the drawing. In alternate embodiments, the mirror can also be pivotable about two or more axes. Furthermore, the possibility exists that the mirror 30 is horizontally movable above the cooking chamber 10. In the last case, it is not necessarily required that the mirror 30 is pivotable.

Furthermore, the device contains an input device and a calculating device, which are not illustrated in the drawing. Using the input device, the user can input parameters which concern the item to be cooked and/or the type of preparation. The parameters can be inputted directly, for example. Likewise, the user can input the type of item to be cooked and if appropriate, the weight thereof. From this information, corresponding parameters can be assigned in the calculation device.

The temperature sensor 20, the distance sensor 22, and the mirror 30 are arranged in such a way that the infrared rays between, on one side, the temperature sensor 20 and/or distance sensor 22, and on the other side, the mirror 30 travel horizontally above the cooking chamber. In addition, the mirror 30 is arranged in such a way that the infrared rays 26 and 28, owing to the reflection, travel between the mirror 30 and the surface of the item to be cooked 12 and the rack 14. The mirror 30 is movable in such a way that the entire width of the cooking chamber 10 can be scanned with the infrared rays 26 and 28.

By the movement of the mirror 30, the surface of the item to be cooked 12 is scanned by both the infrared beam 26 of the temperature sensor 20 and the infrared beam 28 of the temperature sensor 22. In this way, the part of the rack 14 that is not covered by the item to be cooked 10 is scanned. The temperature on the surface of the item to be cooked 12 is detected by means of temperature sensor 20, at multiple temperature measurement points 34 which are selected according to a predetermined schema. Similarly, the distance between distance measuring point 36 and distance sensor 22 is detected at multiple distance measuring points 36 which are likewise selected according to a predetermined schema. Using the multiple distance measurements, it is possible to determine the geometric shape of the item to be cooked 12.

Using the detected surface temperature and geometric shape of the item to be cooked 12 and further known parameters, it is possible to calculate the temperature in the center 18 of the item to be cooked 12. An approximation of the thermal conductivity equation, preferably an approximation equation for cylindrical or flat bodies, is used for this purpose. The thermal conductivity equation is a differential equation, in which particularly the temperature as well as the spatial and temporal derivation of the temperature appear.

The calculation of the temperature in the center 18 of the item to be cooked 12 uses the start temperature of the item to be cooked 12, the thermal conductivity coefficient in the cooking chamber 10, the time since the start of the cooking process, and the chronological progression of the temperature. Furthermore, parameters specific to comestible goods are used for the calculation of the temperature in the center 18 of the item to be cooked 12. These parameters are the density, the thermal conductivity, the heat capacity, and the length or shape of the item to be cooked 12.

The thermal parameters of the item to be cooked can, for example, be inputted directly. Alternatively, the user can select and input the type of comestible good using a selection menu, so that the thermal parameters can be assigned and provided by the calculation device. The heat transfer coefficient in cooking chamber 10 depends on the type of heat supply and can be, for example, provided by a control or regulation device of the cooking device. The time elapsing since the start of the cooking process is measured by a time measuring device, which is not illustrated in the drawing. The chronological progress of the temperature is provided by combination of the measured time and temperatures. The start temperature of the item to be cooked 12 is measured by the temperature sensor 20.

Using the chronological progression of the temperature in the center 18 of the item to be cooked 12, it is possible to determine whether the preparation of the item to be cooked 12 is complete.

Furthermore, it is possible to determine the pasteurizing value of the item to be cooked 12 from the chronological progression of the temperature in the center 18 of the item to be cooked 12. The pasteurizing value P is given by integration over the period of the cooking process:

$$P=\int\{10^{\wedge}[(T_Z-T_D)/Z]/D\}dt.$$

Wherein $T_Z$ is the temperature in the center 18 of the item to be cooked 12. D and Z are values for the thermal resistance of a certain group of bacteria. $T_D$ is the temperature at which the relevant bacteria are destroyed. When the user inputs the type of item to be cooked using the input device, the corresponding parameters D, $T_D$ and Z are assigned and provided in the calculation device.

The preferred embodiment of the invention has the advantage that the measurement of relevant parameters takes place without wires. The determination of the temperature in the center of the item to be cooked 12 proceeds in a manner that is especially convenient for the user, because no other devices are present in the cooking chamber 10.

Only the rack 14 and the item to be cooked 12 are present inside the cooking chamber 10.

In an alternative embodiment, the temperature sensor 20 and the distance sensor 22 are pivotably arranged so that the pivotable mirror 30 is not necessarily required. The alternative embodiment can have a fixed mirror, wherein the direction of the beam is changed by pivot movements of the temperature sensor 20 and the distance sensor 22. Similarly, the alternative embodiment can have no mirror, wherein the temperature sensor 20 and the distance sensor 22 are pivotably arranged in the cooking chamber 10 or above the cooking chamber 10.

In the preferred embodiment, the distance sensor 22 is designed as an infrared sensor. Alternatively for this purpose, the distance sensor 22 can be designed, for example, as an optical sensor or ultrasonic sensor.

The temperature sensor 20 and/or the distance sensor 22 can also be used for other measurements. For example, the temperature sensor can also be used to determine whether comestible goods are dried out. The distance sensor 22 can also be used, for example, to determine the height of the rack 14 in the cooking chamber.

A modification of the invention is a device for determining the contour or the geometric shape of the item to be cooked 12, which comprises the distance sensor 22 and possibly also the mirror 30. In this case, the distance sensor 22 and/or the mirror 30 are arranged or can be mounted pivotably, movably, and/or rotatably, so that the upper side of the item to be cooked 12 can be scanned. In this way it is possible to calculate the shape of the item to be cooked 12.

Instead of a mirror 30, a prism or another optical deflection device can be provided in all embodiments.

Alternatively or additionally to the measurement described for the surface temperature of the item to be cooked, an ambient temperature around the item to be cooked can also be measured and incorporated into the calculation of the temperature inside the item to be cooked 12. The ambient temperature is particularly measured at a measuring location inside the cooking chamber 10 surrounding the item to be cooked, preferably with an ambient temperature sensor 15 arranged at the measuring location, which can be a standard temperature sensor provided for cooking ovens, arranged at a location outside of the item to be cooked 12 that allows for a maximally trouble-free temperature measurement of the surroundings or the surrounding air around the item to be cooked.

LIST OF REFERENCE SIGNS

10 Cooking chamber
12 Item to be cooked
14 Rack
15 Ambient temperature sensor
16 Isotherms
18 Center of the item to be cooked
20 Temperature sensor
22 Distance sensor
24 Guide rail
26 Infrared beam of the temperature sensor
28 Infrared beam of the distance sensor
30 Mirror
32 Axis
34 Temperature measuring point
36 Distance measuring point
$T_Z$ Temperature in the center of the item to be cooked
P Pasteurizing value

The invention claimed is:

1. A device for determining the temperature inside an item to be cooked, wherein the device comprises the following:

at least one temperature sensor for detecting at least one surface temperature of the item to be cooked and/or an ambient temperature around the item to be cooked, at a location inside a cooking chamber surrounding the item to be cooked, at least one distance sensor for determining a distance or multiple distances between the distance sensor and one or multiple distance measuring points on the surface of the item to be cooked, at least one time measurement device for measuring elapsed time during preparation of the item to be cooked, and at least one calculation device for calculating the temperature inside the item to be cooked using the surface temperature of the item to be cooked and/or the ambient temperature, the distance or multiple distances, the elapsed time, and a start temperature of the item to be cooked.

2. The device according to claim 1, characterized in that the calculation device is designed or programmable for calculating the temperature inside the item to be cooked on the basis of a thermal conductivity equation.

3. The device according to claim 1, characterized in that the calculation device is designed or programmable for calculating a temperature in the center of the item to be cooked.

4. The device according to claim 1, characterized in that the temperature sensor is an optical sensor.

5. The device according to claim 1, wherein an ambient temperature sensor is arranged at a measuring location.

6. The device according to claim 1, characterized in that the temperature sensor is an infrared sensor.

7. The device according to claim 1, characterized in that the distance sensor is an infrared sensor.

8. The device according to claim 1, characterized in that the calculation device is designed or programmable for calculating a geometric shape of the item to be cooked from the multiple distances.

9. The device according to claim 8, characterized in that the calculation device is designed or programmable for calculating the temperature inside the item to be cooked by utilizing the geometric shape of the item to be cooked.

10. The device according to claim 1, characterized in that the distance sensor is designed an optical sensor.

11. The device according to claim 10, characterized in that the temperature sensor and/or the distance sensor are pivotably, movably, and/or rotatably arranged or mountable in or on the cooking chamber, such that the surface of the item to be cooked is scannable at least in sections by means of at least one light beam or infrared beam.

12. The device according to claim 1, characterized in that the temperature sensor is provided for detecting the surface temperature at multiple temperature measuring points on the surface of the item to be cooked.

13. The device according to claim 12, characterized in that the distance measuring points and/or the temperature measuring points are selected or selectable from a predetermined schema.

14. The device according to claim 1, characterized in that the device comprises an input device for manually or automatically inputting one or multiple parameters.

15. The device according to claim 14, characterized in that the input device is coupled with the calculation device, so that a parameter or parameters for calculating the temperature inside the item to be cooked are available for use.

16. The device according to claim 1, characterized in that the device comprises a mirror, a prism, or another optical deflection device which can be arranged or mounted in the optical path between the temperature sensor and/or distance sensor on one side, and on the other side, the item to be cooked or an area where the item to be cooked will be placed.

17. The device according to claim 16, characterized in that the mirror or the prism or the deflection device can be pivotably, moveably, and/or rotatably mounted in or on the cooking chamber.

18. The device according to claim 16, characterized in that the temperature sensor, the distance sensor, and/or the mirror are arranged or mountable outside the cooking chamber in a cool or cooled area.

19. The device according to claim 18, characterized in that the cooled area is designed as a cooling channel with at least one blower.

20. A cooking device, which comprises at least one device for determining the temperature inside an item to be cooked according to claim 1.

21. The cooking device according to claim 20, characterized in that the cooking device comprises a cool or cooled area, in which the temperature sensor, the distance sensor, and/or a mirror are arranged or mountable.

22. The cooking device according to claim 21, characterized in that the cool or cooled area is designed as a blower channel.

23. A method for determining the temperature inside an item to be cooked, wherein the method comprises the following steps:

detecting at least one temperature on the surface of the item to be cooked and/or at least one ambient temperature around the item to be cooked, at a measuring location inside a cooking chamber surrounding the item to be cooked, detecting a distance or multiple distances between a predetermined position and one or multiple distance measuring points on the surface of the item to be cooked, measuring an elapsed time during a cooking process, and calculating the temperature inside the item to be cooked using the surface temperature of the item to be cooked and/or the ambient temperature around the item to be cooked, the distance or multiple distances, the elapsed time, and a start temperature of the item to be cooked.

24. The method according to claim 23, characterized in that the temperature inside the item to be cooked is calculated on the basis of a thermal conductivity equation.

25. The method according to claim 23, characterized in that the multiple distances are detected by means of a scan of at least one section of the surface of the item to be cooked using an infrared beam or a light beam.

26. The method according to claim 23, characterized in that the temperature is detected by a scan of at least one section of the surface of the item to be cooked using an infrared beam or a light beam.

27. The method according to claim 23, characterized in that the temperature inside the item to be cooked is calculated using a chronological progression of the surface temperature of the item to be cooked.

28. The method according to claim 23, characterized in that the temperature inside the item to be cooked is calculated using the density of the item to be cooked.

29. The method according to claim 23, characterized in that the temperature inside the item to be cooked is calculated using a heat transfer coefficient.

30. The method according to claim 23, characterized in that the temperature inside the item to be cooked is calculated using the thermal conductivity of the item to be cooked.

31. The method according to claim 23, characterized in that the temperature inside the item to be cooked is calculated using the heat capacity of the item to be cooked.

32. The method according to claim 23, in which the time it will take to reach a predetermined core temperature is extrapolated from the detected surface temperature and/or ambient temperature by means of a thermal conductivity equation.

33. The method according to claim 23, wherein an ambient temperature sensor is arranged at a measuring location.

34. The method according to claim 23, characterized in that the temperature is detected by a scan of at least one section of the surface of the item to be cooked using an ultrasonic beam or a radar beam.

35. The method according to claim 23, characterized in that a geometric shape of the item to be cooked is calculated from the multiple distances.

36. The method according to claim 35, characterized in that the temperature inside the item to be cooked is calculated by utilizing the geometric shape of the item to be cooked.

37. The method according to claim 23, characterized in that a temperature in the center of the item to be cooked is determined.

38. The method according to claim 37, characterized in that a pasteurizing value is calculated from a chronological progression of the temperature in the center of the item to be cooked.

* * * * *

UNITED STATES PATENT AND TRADEMARK OFFICE

CERTIFICATE OF CORRECTION

PATENT NO. : 8,360,633 B2
APPLICATION NO. : 12/444401
DATED : January 29, 2013
INVENTOR(S) : Luckhardt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this
First Day of September, 2015

Michelle K. Lee
*Director of the United States Patent and Trademark Office*